3,192,126
PULSED ADSORBER
James Van Dyck Fear, Media, Pa., assignor to Sun Oil Company, Philadelphia, Pa., a corporation of New Jersey
Filed Oct. 23, 1961, Ser. No. 146,861
1 Claim. (Cl. 196—46)

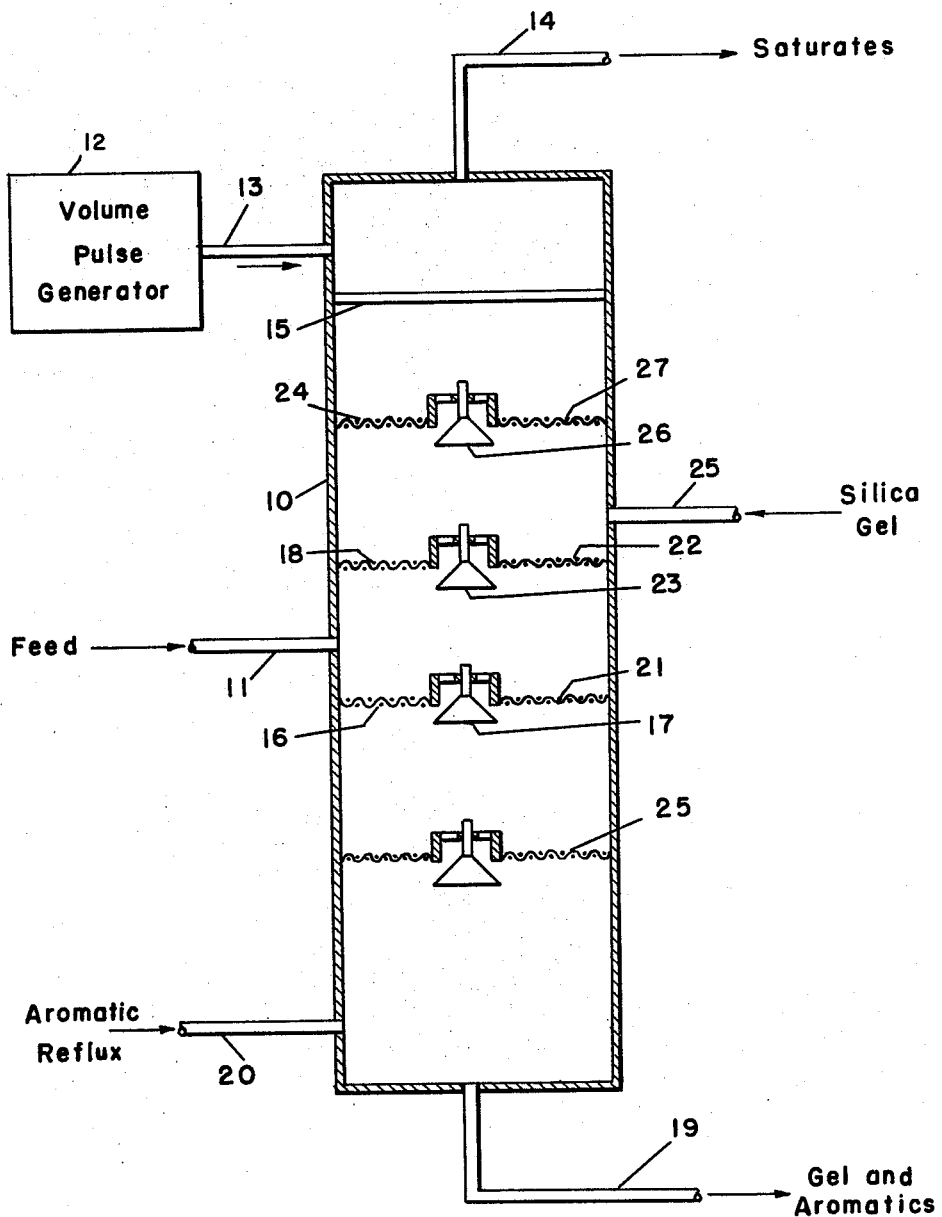

This invention relates to an apparatus for contacting liquids and solids. More particularly it relates to an apparatus for effecting separation of components from a multi-component mixture, in which separation a selective adsorbent is utilized in the form of a moving, pulsed bed. It especially relates to an apparatus useful in a continuous adsorption separation process wherein the liquid phase is subjected to a volume pulse to alternately reverse the directional flow of the liquid phase within the bed.

It is well known in the art that particulate solids such as silica gel, activated charcoal, activated alumina, clays, bauxite, synthetic resins, e.g., molecular sieves, magnesia, and the like, have the property of selectively adsorbing or taking up particular liquid components, i.e., some components are more readily adsorbed while others are less readily adsorbed. In this manner a separation may be obtained between components of a two-component mixture, or a multi-component mixture may be separated into two or more fractions of different characteristics or properties according to adsorbability. These prior art processes usually recover the adsorbed material by using a second liquid, sometimes called a solvent, for which the solid adsorbent has less affinity than the component which it has adsorbed. However, depending on the particular system, the use of a second liquid for which the adsorbent has more affinity than the adsorbed component is also satisfactory. Still further, the adsorbed component or components can be desorbed or removed by vaporizaition from the adsorbent such as by treating the adsorbent with higher temperature steam, hot gases, or by burning off the adsorbed material. Each of the above-mentioned methods are characterized by the attempt to recover or remove the adsorbed material, thus reactivating the adsorbent.

In the continuous prior art processes, the solid adsorbent in particulate form is passed downwardly in the form of a compact bed or columnar mass in contact with the liquid material which is being treated. The liquid feed is introduced at an intermediate point in the column of adsorbent; and the unadsorbed components are removed, usually, from the top. The adsorbed component or components are removed with the solid adsorbent from the bottom. The adsorbed material is then separated from the solid in a separate column. However, it is equally satisfactory to desorb the components from the solid in the same column.

It is well known that these continuous prior art adsorption processes inherently have difficult operating problems. For example, the various particle sizes would fall through the column at different rates; there are radial distribution problems; there is usually inefficient solid-liquid contact resulting in, say, poor diffusion of aromatics through liquid to the adsorbent site; etc.

The object of the present invention is to provide an apparatus which when used in a continuous adsorption separation process overcomes the faulty-distribution-of-solids problems and which materially increases the efficiency of solid-liquid contacting.

The invention may be more fully understood by reference to the accompanying figure which illustrates not only one embodiment of the apparatus itself but also an adsorption separation process employing such apparatus.

The present invention is an apparatus for contacting liquids and solids in, for example, an adsorption column. The contacting is effected, preferably, in a vertically disposed column housing at least one adsorption zone but can be satisfactorily effected in a horizontally disposed column. Solid adsorbent selective for at least one component of a multi-component feed mixture is fed into the zones, and the liquid feed is flowed progressively through a plurality of vertically superposed adsorption zones, each of the zones being defined by perforate baffle means comprising substantially horizontal foraminous trays adapted to permit upward pasasge of liquid therethrough and to permit downward passage of liquid and solid therethrough. A volume pulse is imposed on the adsorption zone to alternately reverse the directional flow of the liquid phase within the zone, thereby moving the solid adsorbent down the column. A product stream comprising the adsorbent having adsorbed therein at least one adsorbed component is withdrawn from the lowermost end of the column. At the other end of the column, at least one non-adsorbed component is removed.

The invention is an apparatus for effecting contact between liquids and solids which comprises in combination (a) a vertical column with solid inlet means near the top; (b) solid-liquid outlet means near the bottom; (c) liquid feed inlet means to at least one hereinafter specified contacting zone at a locus intermediate the solid inlet and solid-liquid outlet means; (d) liquid outlet means at the uppermost locus; and (e) means for alternately reversing the direction of liquid flow within the column; said column additionally having internally positioned intermediate the solid inlet and solid-liquid outlet means perforate baffle means defining at least one contacting zone; said baffle means comprising substantially horizontal foraminous trays adapted to permit upward passage of solely liquid therethrough and to permit downward passage of liquid and solid therethrough.

In the accompanying drawing, a separating zone 10 is illustrated in the form of a vertical elongated shell or column through which the adsorbent passes as a moving bed. The adsorbent is preferably in granular form, e.g., particles from 3 to 300 mesh. Volume pulse generator 12 is connected to the adsorber by means of line 13. In the drawing, generator 12 is positioned at the top end of the adsorber. It is to be understood, however, that generator 12 may be placed at any position whereby a volume pulse can be imposed on the separator or adsorption zone. As used herein, the volume pulse generator can be of any type known to the art. Conventionally, the volume generator is a long-stroke piston arrangement such that the stroke of the piston moves the entire body of liquid within the zone a finite distance. Usually the volume of liquid moved is 0.1 to 0.5 times the volume of the zone. The piston is driven by any suitable power source (not shown) such as an electric motor, gas turbine, reciprocating engine, or the like.

The frequency of pulsation may vary from 10 to 500 pulses per minute with preferred rate between 100 and 200 pulses per minute.

The column 10 is divided into any desired number of contact zones, one of which is illustrated in the drawing by the area between baffle means 16 and 18. Each baffle means is preferably a substantially horizontal foraminous tray containing a centrally disposed check valve 17. Lying adjacent to and supported by baffle 16 is a wire mesh coalescer 21 through which solid material cannot pass. Similarly, a wire mesh coalescer 22 is supported by baffle means 18 and is adjacent to check valve means 23. Check valves 17 and 23 are designed to open downward, i.e., material may pass through the valve in a downwardly direction, but the valve is closed for passage of material up the column.

In the apparatus shown, baffle plates 16 and 18 form one contacting zone. Similarly baffle plates 18 and 24 and 16 and 25 form other contacting zones. It will be understood that although the drawing shows the apparatus with only three zones, any desired number can be vertically superposed in the column, depending on the number of stages found most efficient for the operation contemplated. Ten to thirty zones can readily be built in a single column. Some processes may, however, require only one stage, e.g., a simple treating step; others may require as many as 50 or more contact zones.

Further, as used herein, the baffle means which define the contact zone may contain one or more check valves. The baffle plates may contain a plurality of check valves geometrically spaced around the center-line of the baffle.

As illustrative of a specific embodiment of the operation of the pulsating adsorber, a multi-component mixture, which it is desired to separate into at least two components such as a mixture of toluene and hexane in approximately a 1 to 1 volume ratio, is charged through line 11 into column 10. Feed is continued until column 10 is filled with liquid. Volume pulse generator 12 is started, and the pulse rate set at 300 pulses per minute and for 0.2 times the volume of the adsorption zone. The adsorption system is maintained at about ambient or room temperature and atmospheric pressure. However, superatmospheric or subatmospheric pressure may be desirable in some cases. Furthermore, in general, the upper limit on temperature is the boiling point of the feed at the operating pressure with the lower temperature limit being the freezing or solidification point of the feed. Preferably, the operating temperature should be as close to the freezing point of the feed material as is practical. Those skilled in the art are familiar with such requirement.

Silica gel is passed into column 10 via line 25 at a point between baffle plate 24 and perforated plate 15 which will not permit passage of solid material but will pass liquids.

On the downstroke of the volume pulse generator 12, check valve 26 and all other valves open and liquid plus silica gel flow through the valve into the contact zone defined by baffle plates 18 and 24. Toluene is adsorbed by the silicia gel. On the upstroke of the generator, valve 26 closes as do the other valves, trapping the silica gel between baffle means 18 and 24, but liquid of reduced toluene content passes through filter 27. The pulse cycle is now repeated until silica gel and adsorbed toluene are removed from the column via line 19, and substantially pure, e.g., less than 1 percent toluene, hexane is removed via line 14 at the top of the column 10.

The silica gel removed from line 19 is further treated to desorb the toluene. The regenerated silica gel can be recycled to the process for re-use, if desired.

Preferably, toluene as reflux is continuously introduced into the lower part of the column via line 20 in order to preferentially displace any hexane hydrocarbons carried in the adsorbed phase into the lower part of the column and prevent hexane from being carried out with the silica gel.

While the hereinabove-described specific embodiment applied to the separation of toluene from hexane using an aromatic solvent as reflux, it is to be understood that the apparatus is suitable for other separation-by-adsorption applications.

Actually, the invention may be employed in the separation of any liquid mixture amenable to separation by preferential adsorption. By way of illustration, suitable feed stocks to the apparatus include kerosene distillates which may be dearomatized and desulfurized to produce a superior grade stock, e.g., low smoke point jet fuel; Diesel fuel which may be dearomatized to produce a high cetane number product; lubricating oils which may be dearomatized and deasphaltized to give a high quality oil; aromatic-paraffinic mixtures; paraffinic-isoparaffic mixtures; olefinic-paraffinic mixtures; aromatic-aromatic mixtures, such as separating alkylbenzenes from, say, naphthalene; and the like. The invention is particularly suitable for various chromatographic separations. Further, catalytically-reformed naptha may be separated into an aromatic adsorbate and an nonaromtic percolate; and cracked naphtha may be processed to separate aromatic, olenfinic, and paraffinic fractions. Other illustrations of feed materials include the reaction products of the Fisher-Tropsch synthesis and of the Oxo process containing substantial amounts of oxygenated organic compounds which may be separated into an oxygenated compound fraction and a hydrocarbon fraction. Further, the well-known molecular sieve processes are especially adaptable to this invention.

As used herein, the term "multi-component mixture" is defined as a mixture of hydrocarbons containing two or more components. Thus, a binary system is within the scope of the term "multi-component."

I claim:

An apparatus for contacting liquids and granular solids which comprises a vertical column in combination with
(a) solid inlet means near the top;
(b) solid-liquid outlet means near the bottom;
(c) liquid feed inlet means to at least one hereinafter specified contacting zone at a locust intermeidate the solid inlet and solid-liquid outlet means;
(d) liquid outlet means at the uppermost locus; and
(e) means for alternately reversing the direction of liquid flow within the column so that liquid flows alternately up and down the column said column additionally having internally positioned intermediate the solid inlet and solid-liquid outlet means a plurality of vertically spaced perforate baffles defining a series of contacting zones, each of said zones being totally enclosed by a pair of adjacent baffles and the wall of said column; baffles comprising substantially horizontally foraminous trays each of which contains an approximately centrally disposed check valve; said tray being adapted to permit upward passage of solely liquid therethrough, to permit downward passage of liquid therethrough, and to permit downward passage of solid therethrough only through said check valve and only when said direction reversing means causes liquid flow down the column.

References Cited by the Examiner

UNITED STATES PATENTS 2,731,456   1/56   Weedman _____ 23—270
2,765,913   10/56   Weiss _____ 23—270
2,813,781   11/57   Mertes _____ 23—310

FOREIGN PATENTS 152,440   7/53   Australia.

OTHER REFERENCES

Jealous et al.: "Chemical Engineering Progress," 1956, vol. 52, No. 9, pages 366–370 23–270.5.

ALPHONSO D. SULLIVAN, *Primary Examiner.*